S. Inman.
Brick Mold.
No. 97,642.        Patented Dec. 7, 1869.
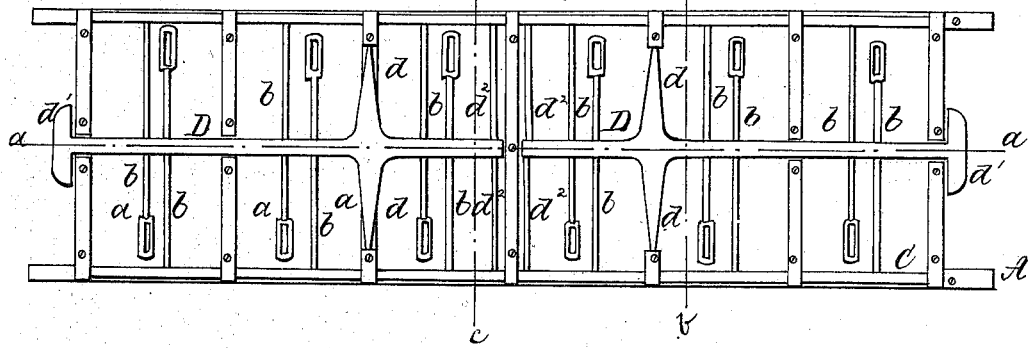
Fig. 1
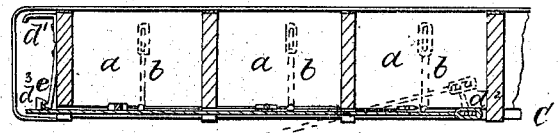
Fig. 2. Sect d-d
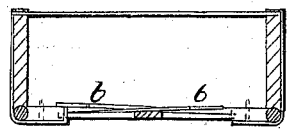
Fig. 3. Sect b-b
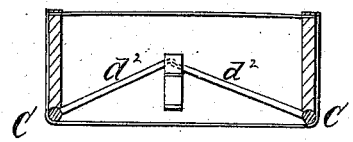
Fig. 4. Section c.c
Witnesses,
E. A. Clarkson
Inventor,
Stephen Inman
by H. W. Beadle
his Attorney

United States Patent Office.

STEPHEN INMAN, OF ROCKFORD, ILLINOIS.

Letters Patent No. 97,642, dated December 7, 1869.

IMPROVEMENT IN BRICK-MOULDS.

The Schedule referred to in these Letters Patent and making part of the same.

*To all whom it may concern:*

Be it known that I, STEPHEN INMAN, of Rockford, in the county of Winnebago, and State of Illinois, have invented a new and useful Improvement in Brick-Moulds; and I do hereby declare that the following is a full and exact description of the same, reference being had to the accompanying drawings, and to the letters of reference marked thereon.

This invention relates to that class of brick-moulds which is provided with a series of followers in its divisions, which are simultaneously operated for the purpose of expelling the newly-formed brick; and consists mainly in the arrangement of the levers for operating the followers.

The details of construction and manner of operation will be fully described hereinafter.

In the drawings—

Figure 1 represents a plan view, and

Figures 2, 3, and 4, sectional elevations of the mould at different points, as indicated in fig. 1.

To enable others skilled in the art to make and use my invention, I will now proceed to fully describe its construction and operation.

A represents a brick-mould, which is provided with the divisions $a\ a\ a$, in the usual well-known manner.

In each of these divisions is placed a follower, which is held and operated by means of the cross-rods $b\ b$, which are attached thereto in any suitable manner that will permit the necessary movement.

The outer ends of these cross-rods are rigidly attached to the longitudinal turning rods C C, as shown in the drawings.

The rods C C are held in position by any suitable means, it being essential, however, that they be permitted to revolve freely in their bearings.

By giving these rods a partial revolution, the free ends of the cross-rods $b\ b$, will, of course, be caused to describe the arc of a circle, and thus operate the followers.

To operate the rods C C, I provide the levers D D, which may be arranged in any suitable manner therefor. I preferably provide them with arms $d\ d$, which have their bearing upon one of the partitions of the mould, as shown, the partition being recessed, in order that the lever may not project beyond the surface line of the mould.

The short arm of the levers is slotted to receive the ends of the rods $d^2$, by means of which connection is made with the rods C C.

The long arm of the levers extends to the ends of the mould, as shown, and is provided with the handles $d^1\ d^1$, to enable it to be easily grasped.

It will be observed that each of the partitions, crossed by the levers, is recessed to receive them, in order that that the lower surface of the moulds may be free from projections when it is inserted into the machine.

In order that the levers may be securely fixed in place when not in operation, I provide the spring-catches $e$, which engage with catches $d^3\ d^3$ upon the handles of the levers, as shown.

The operation is as follows:

The mould is inserted in the machine, and filled in the usual manner, the levers D, of course, being perfectly secured in place. When filled, it is carried to the drying ground and inverted. The catches are now sprung back from the levers by the fingers of the operator, and the latter are operated, and the brick thereby expelled.

Having thus fully described my invention,

What I claim as new, and desire to secure by Letters Patent, is—

1. The combination of the longitudinal turning rods C and arms $b$, with the centrally-arranged lever D and rods $d^2$, as described, for the purpose set forth.

2. The brick-mould described, consisting of the box A, with divisions $a\ a\ a$, followers, cross-rods $b$, turning rods C, levers D, connecting-rods $d^2$, and catches $e$, when combined and arranged as described, for the purpose set forth.

This specification signed and witnessed, this 30th day of September, 1869.

STEPHEN INMAN.

Witnesses:
G. W. FORD,
F. N. WELDEN.